(No Model.)
B. DAWSON.
PEN FOR LIVE STOCK.
No. 327,665. Patented Oct. 6, 1885.
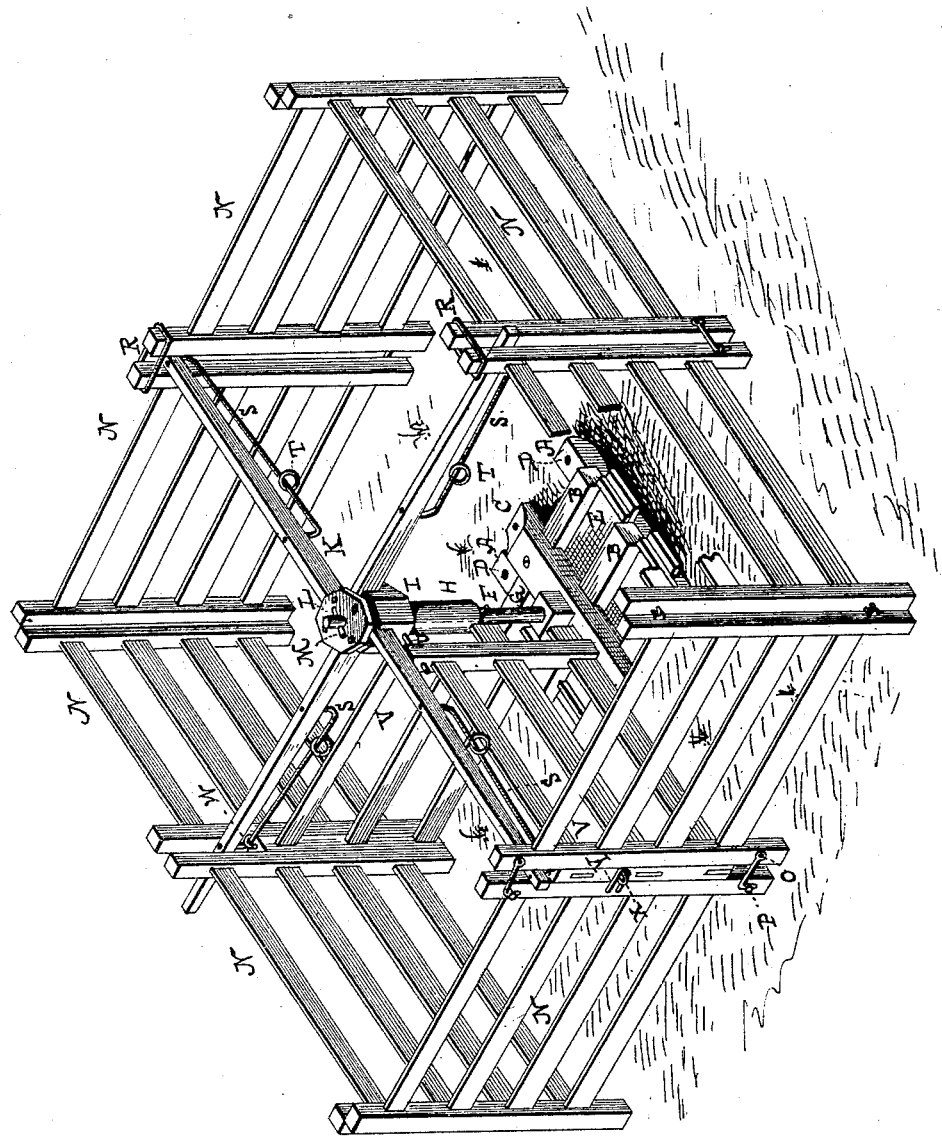
WITNESSES
Edwin L. Yewell.
John Bales.
INVENTOR
Benjamin Dawson
by Frank Sheehy
his Attorney

UNITED STATES PATENT OFFICE.

BENJAMIN DAWSON, OF LEONARDTOWN, MARYLAND.

PEN FOR LIVE STOCK.

SPECIFICATION forming part of Letters Patent No. 327,665, dated October 6, 1885.

Application filed May 20, 1885. Serial No. 166,172. (No model.)

*To all whom it may concern:*

Be it known that I, BENJAMIN DAWSON, a citizen of the United States, residing at Leonardtown, in the county of St. Mary's and State of Maryland, have invented certain new and useful Improvements in Pens for Live Stock; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in pens for live stock, and is designed to produce a pen in which the animals may have a limited freedom, so constructed as to be easily accommodated to small or large stock. This is accomplished by making the pen adjustable vertically on its pivotal post, and providing removable partitions or gates, by means of which sections of the whole may be utilized.

In describing the construction, reference is had to the annexed drawing, in which is represented a perspective view.

That the device may be transported from place to place, it is supported upon two beams, A, with one end rounded, forming sled-runners. On these runners are secured cross-pieces B, on top of which rests a longitudinal piece, C. The runners are provided with holes D, through which pins may be driven, entering the ground and holding the device in position.

To an eye in the end of the piece C may be fastened a chain or other device for drawing the device.

Between the cross-strips B rest water-troughs E.

On the piece C is erected a post, F, having a series of holes, G. Surrounding the post, and supported adjustably as to height by a collar, H, and pin passing through one of the holes G, is a hub, I, recessed at several points on its upper surface, said recesses forming seats for arms K, radiating from said hub. A cap-plate, L, secures these arms in place, and a pin, M, passing through the post above the plate prevents the hub from rising above the post.

A series of panels, N, of fencing are hinged together in pairs, the hinged portions forming the corners of the inclosure.

To the free ends of the panels of each pair are hooks O, and eyes or pins P at both top and bottom; or loops R may be used to pass over and secure the upwardly-projecting ends of the panel-posts.

Between the coinciding ends of the pairs of panels are clamped the arms K, by means of which the inclosing fencing is supported, and, being raised from the ground, is free to turn on the post, which acts as a supporting-pivot.

On the under sides of the arms are extended guides S for the rings T, to which the animals may be secured.

On projecting pins U on the hub is hung one end of short narrow panels V, the other end being provided with a hook, W, which engages over the guide S. On the outer ends of these small panels are staples X, which pass through staples Y on the larger panels, and thus stiffen the small panel and prevent its swinging.

Within the pen thus made may be placed small animals, such as are too small for tying, or which are wished to be kept separate from those in the other part of the inclosure.

The vertical adjustment admits of the setting up of the panels while they rest on the ground, and then raising them till the fencing is clear of the ground, or of raising at different heights to accommodate different-sized stock.

I claim—

1. A pen consisting of a revolving fence composed of removable panels, and removable partitions within the pen, the whole arranged on a vertical central post having a sled-base, substantially as specified.

2. A pen consisting of a movable pivotal post, a hub with radial arms, and an inclosing fence supported by said arms, said fence being formed of a series of double panels, each pair being hinged and removably secured, one pair to the other, substantially as and for the purpose specified.

3. A pen-support consisting of a vertical post having a sled-base, a vertically-adjustable block provided with radial arms, and means, substantially as described, for securing the said arms in vertical adjustment, as set forth.

4. A pen-tether consisting of a pivotal post mounted on a sled-support, a hub with radial arms adjustable vertically on said post, and a fence formed of panels hinged together in pairs, and having their coincident ends removably secured, one to the other, and clamping the arms between them, substantially as and for the purpose specified.

5. A pen consisting of a pivotal post, a hub thereon with radial arms, extended guides and rings on the arms, a fence supported by said arms, and formed of panels hinged together in pairs and removably secured together at the coinciding ends, and removable panels extending from the hub to the inclosing fence on a line with the arms, substantially as and for the purpose specified.

In testimony whereof I affix my signature in presence of two witnesses.

BENJAMIN DAWSON.

Witnesses:
 DANL. C. HAMMETT,
 JAS. H. ALVEY.